United States Patent
Stählin et al.

(10) Patent No.: US 8,401,238 B2
(45) Date of Patent: Mar. 19, 2013

(54) MAP MATCHING FOR SECURITY APPLICATIONS

(75) Inventors: Ulrich Stählin, Eschborn (DE); Marti Minoves, Sant Vicenc de Torello (ES); Anselm Keil, Hofheim (DE)

(73) Assignee: Continental Teves AG & Co. oHG (DE)

( * ) Notice: Subject to any disclaimer, the term of this patent is extended or adjusted under 35 U.S.C. 154(b) by 83 days.

(21) Appl. No.: 12/916,890

(22) Filed: Nov. 1, 2010

(65) Prior Publication Data

US 2011/0129122 A1  Jun. 2, 2011

Related U.S. Application Data

(63) Continuation of application No. 12/601,889, filed as application No. PCT/EP2008/055850 on May 13, 2008, now abandoned.

(30) Foreign Application Priority Data

May 29, 2007 (DE) .......................... 10 2007 025 065
May 13, 2008 (DE) .......................... 10 2008 023 242

(51) Int. Cl.
*G06K 9/00* (2006.01)
(52) U.S. Cl. ...................................................... 382/106
(58) Field of Classification Search ................... 382/106
See application file for complete search history.

(56) References Cited

U.S. PATENT DOCUMENTS

| 5,902,351 | A | 5/1999 | Streit et al. | |
|---|---|---|---|---|
| 2002/0177950 | A1 | 11/2002 | Davies | |
| 2004/0181335 | A1* | 9/2004 | Kim et al. | 701/207 |
| 2006/0047423 | A1* | 3/2006 | Min | 701/209 |
| 2006/0082495 | A1 | 4/2006 | Wakamatsu et al. | |
| 2006/0128370 | A1* | 6/2006 | Tahara | 455/420 |

FOREIGN PATENT DOCUMENTS

| DE | 4432208 A1 | 3/1995 |
|---|---|---|
| DE | 102004029543 A1 | 10/2005 |
| EP | 0522862 A1 | 1/1993 |
| EP | 0598518 A1 | 5/1994 |
| GB | 2382482 A | 5/2003 |
| WO | WO 01/61271 A1 | 8/2001 |
| WO | WO2005/120879 A1 | 6/2005 |

* cited by examiner

*Primary Examiner* — Bhavesh Mehta
*Assistant Examiner* — Nirav G Patel
(74) *Attorney, Agent, or Firm* — RatnerPrestia

(57) ABSTRACT

An apparatus for map matching between a measured position for an object and information on a digital map is specified. This involves a computation unit being used to perform a first selection of cartography elements on the map on the basis of the measured position and on the basis of a predefined error. In addition, the computation unit is designed to provide the selected cartography elements for a first and a second secondary computation unit. In addition, values from the secondary computation units are converted in the same unit of measurement.

14 Claims, 7 Drawing Sheets

MAP MATCHING FOR SECURITY APPLICATIONS

CROSS REFERENCE TO RELATED APPLICATIONS

This application is a continuation application of application Ser. No. 12/601,889, filed Nov. 25, 2009, which is a the U.S. national phase application of PCT international Application No. PCT/EP2008/055850, filed May 13, 2008, which claims priority to German Patent Application No. 102007025065.9, filed May 29, 2007 and German Patent Application No. 102008023242.4, filed May 13, 2008, the contents of such applications being incorporated by reference herein.

FIELD OF THE INVENTION

The invention relates to the calculation of position data for an object. In particular, the invention relates to an apparatus for aligning a measured position for an object with information on a digital map, for a system, to the use of an apparatus, to a vehicle, to a process, to a program element and to a computer-readable medium.

BACKGROUND OF THE INVENTION

Safety-relevant vehicle assistance systems need to be capable of predicting dangerous situations which can result in a loss of vehicle control or in a collision. If such a situation is predicted in good time, it can sometimes be avoided, specifically autonomously, for example by slowing down the vehicle, or by warning the driver about this imminent situation using a warning system.

This forecast capability has previously been provided by various types of sensors, radar systems or cameras, but these are all limited to the direct field of vision of the vehicle. This means that they are not able to provide any information about what happens after a bend, for example. Map data can be used to improve these predictions and, by way of example, to be able to forecast how the road proceeds after the next bend. In order to use the information on a map, it is necessary to know the current position. This current position can be identified using various means, e.g. with a GPS receiver, which can be an inexpensive and global solution.

The GPS or another positioning system has an error which does not always allow a position to be indicated accurately on a road. Furthermore, a map may also always have some accuracy errors and discrepancies from the actual cartography, which makes the position-finding directly on a road more difficult or even impossible.

SUMMARY OF THE INVENTION

It is an object of the invention to provide improved alignment of a measured position for an object with information on a digital map.

The invention specifies an apparatus for aligning a measured position for an object with information on a digital map, a system, a use for an apparatus, a vehicle, a process, a program element and a computer-readable medium in accordance with the features of the independent claims. Developments of the invention can be found in the subclaims.

The exemplary embodiments described relate equally to the apparatus, the system, the use, the vehicle, the process, the program element and the computer-readable medium.

One exemplary embodiment of the invention specifies an apparatus for aligning a measured position for an object (for example a vehicle) with information on a digital map, wherein the apparatus has a computation unit. In this case, the computation unit is designed to make a first selection of cartography elements on the map on the basis of the measured position and on the basis of a predefined error. In addition, the computation unit is designed to provide the selected cartography elements with a first and a second subunit.

In addition, the first selection can additionally or alternatively also be made on the basis of coordinates for the cartography elements by the computation unit.

In this case, it should also be noted that within the context of the invention the term "alignment" is equivalent to the term "map matching", and vice versa.

In this context, the term "cartography element" is subsequently intended to be understood to mean any element of a map which can be represented using the four basic elements: node, segment, path or loop. In this context, a node is a point in space which has GPS coordinates, for example, such as width and height. A segment is a line which connects two nodes to one another and a path is a set of grouped segments.

In other words, this exemplary embodiment of the invention specifies a fast exclusion filter which selects those cartography elements with their given position which satisfy a predefined error criterion. This criterion may have been calculated from a maximum distance, for example, which is represented graphically by a circle with radius of the maximum distance around the measured position. In this case, it is possible to calculate, by way of example, whether the segments are within the maximum error on the basis of different formulae. This filter method for the fast exclusion of cartography elements is also illustrated in FIG. 1 and FIG. 4 for example.

This selection of those cartography elements which are relevant for a subsequent map matching process allows map matching to be performed more quickly and with less computation power. The aim of a subsequent map matching method is to use the position-finding of a GPS, for example, which has a specific error, to decide between possible points on a map to which point the position-finding relates. In some cases, it is necessary to decide, following reception of a GPS position, for example, on which road the GPS receiver is situated. In this case, it is first of all necessary to analyze why alignment or map matching needs to be performed and particularly what method or what map matching process is to be used to do so. The best method is then extracted and the computation units are then assessed.

By way of example, in the case of a vehicle, it is possible for the measured position, which cannot be exact on the basis of a wide variety of error sources, to be matched to map data. During this process, the map data may likewise contain errors. It is therefore possible to select the two closest roads, for example, from a map with a large number of roads, which are situated further away, however. In this case, roads can be regarded as a segment or cartography element. Subsequent calculation of the probability, on the basis of the vehicle state, of which of the two roads the vehicle is actually on can be calculated and compared in parallel using various methods.

In this context, it should also be noted that the apparatus and the computation unit can use mathematical processes or algorithms which can be performed on a CPU, for example. On the basis of this first selection of cartography elements, unnecessary cartography elements or segments are therefore reduced and eliminated from the digital map, which subsequently allows simplified alignment to be performed, for example.

It should likewise be pointed out that the computation unit is also designed such that it provides the selected cartography elements for any number of further secondary computation units. It is naturally also possible to use just one secondary computation unit.

In this context, the predefined error may be an error value which is based on an error distribution in the GPS system, for example. The error distribution in the GPS system corresponds to a normal distribution, from which it is possible to derive a predefined error. Alternatively, this error value can be iteratively matched and optimized on the basis of individual alignments.

In other words, the apparatus eliminates the number of data items for the cartography elements by virtue of the first selection such that a subsequent improvement or check on the measured position is concentrated only on a small map and is then only necessary to calculate and assess the relevant segments with their positions. In other words, the information from the map is prefiltered for a complex finishing process. This can mean a significant saving on time and computation power.

In this case, provision may also be made for the value of the predefined error to be adaptively matched to the situation. That is to say that the apparatus increases the maximum scope of error if no map matching at all can be performed within the covered region. If map matching is possible, the system reduces the maximum scope of error as far as the theoretically predefined value.

In this context, the selection of the relevant cartography elements by the apparatus can be used to subsequently perform simultaneous weighing up and assessment of the various cartography elements using the various modules or using various secondary computation units. In this case, said secondary computation units can be regarded as independent map matching algorithms which can operate simultaneously, in parallel and independently of one another. Without the first selection by the apparatus, alignment of a measured position for an object with information on the digital map would be far more complex and could be performed in real time only with difficulty.

In this case, the measured position may also be a non-current data record, and also an at least partial calculation of the measured position from an earlier position data record is possible. A navigation capability is therefore not an essential component of this exemplary embodiment. In addition, alignment can be followed by the new position being supplied to the apparatus and/or to the computation unit again as feedback information. This corresponds to a feedback loop for optimized map matching.

This can be done using a position-finding unit such as a GPS unit in the object, for example. In this case, it should be pointed out that within the context of the present invention, GPS is representative of all global navigation satellite systems (GNSS), such as GPS, Galileo, GLONASS (Russia), KOMPASS (China), IRNSS (India).

The term "digital maps" is also intended to be understood to mean maps for Advanced Driver Assistant Systems (ADAS), without navigation taking place. In this case, the digital map format used can be selected on the basis of criteria and parameters and possibly altered in order to allow this and any other exemplary embodiment of the invention. It is possible for the format to be matched to the algorithms used. By way of example, it is possible to use or produce a format which improves the inventive selection of cartography elements and the parallel calculation of values in individual secondary computation units.

The secondary computation units may also be physically contained in the computation unit.

In line with a further exemplary embodiment of the invention, the apparatus also has the first and second secondary computation units, wherein the first secondary computation unit is designed to calculate a first value for each selected cartography element using a first process or a first method. In addition, the second secondary computation unit is designed to calculate a second value for each selected cartography element using a second process or a second method, wherein the first and second values are calculated in the same unit of measurement or are converted to the same unit of measurement.

In other words, the secondary computation units and the methods used are designed such that respective specific physical units of the secondary computation unit are converted to a prescribed base unit, the same unit of measurement. Should algorithms be used for calculating the values, it is necessary for the algorithms to be selected such that the predefined unit of measurement is always obtained for each secondary computation unit used. In this case, the choice of the same unit of measurement can be prescribed by the apparatus, by the computation unit, that is to say the fast exclusion filter, or else by a user. The calculation of the values in the various secondary computation units in a common unit allows the subsequent direct comparison of values for the individual cartography elements. This allows various calculation methods to be combined and therefore provides more information for the decision about an alignment. This minimizes any possible error in the alignment.

In other words, for two roads with their distances from the measured position and with their orientations in comparison with the current position and motion state of the object, for example, a distance module and an angle module calculate values with which a probability can be associated. This value indicates the probability of the real position of the vehicle being in the position of the respective cartography element. Additional assessment or tuning using a tuning parameter likewise allows a secondary computation unit and the values calculated therein to be weighted.

The map matching algorithm therefore applies various analysis methods to the selected cartography elements and then evaluates the results of all methods. To be able to compare the values from the different methods, the normally different units need to be converted or transformed.

In other words: different factors assess different input parameters, which is why the result thereof can be expressed in different units. By way of example, a distance module, which can be regarded as the first secondary computation unit, indicates a distance, whereas an angle module, which can be regarded as the second secondary computation unit, indicates an angle. Since angles cannot be compared with distances, the inventive apparatus indicates a way of defining units of measurement and of providing a conversion for the individual units of the individual secondary computation units.

In line with a further exemplary embodiment of the invention, the apparatus is also designed to add the first and second values of each selected cartography element to form a respective final value.

This naturally does not exclude the addition also being implementable in the case of further secondary computation units which provide further values.

In this manner, the cartography elements collect particular point numbers from individual secondary computation units or modules. The point numbers each have corresponding probabilities of the cartography elements being at the actual position of the object, with an order being created on the basis of these probabilities of the cartography elements following addition of the individual values of a cartography element to form a final value. This order is used for the alignment or the map matching.

In line with a further exemplary embodiment of the invention, the apparatus is also designed to assess the first secondary computation unit and to assess the second secondary computation unit, which results in a corresponding weighting for the two values of each selected cartography element.

In this case, the assessment of the secondary computation units can be controlled and performed by the computation unit, but assessment by the user of the apparatus or else automatic assessment on the basis of provided measured data is also possible.

All the secondary computation units or modules can be regarded as separate map matching algorithms. By virtue of the assessment or by modification of a tuning parameter, it is possible to use just one module for the map matching and to perform said map matching nevertheless. To this end, it is possible, by way of example, for the influences of the other secondary computation units over the tuning parameters or the weighting to be zeroed. Thus, this apparatus is capable of providing map matching as a combination of various secondary computation units or various map matching algorithms. Should there be a particular map situation, it is possible to implement that combination of the secondary computation units with an appropriate assessment for which the decision method is best.

In line with a further exemplary embodiment of the invention, the apparatus is also designed to make a second selection of a destination cartography element from the selected cartography elements on the basis of the final values. In addition, the apparatus is designed such that the alignment is performed on the basis of the destination cartography element.

In other words, calculation of all the relevant and previously already selected cartography elements in the various secondary computation units can therefore be followed by the selection of the destination cartography element. In this case, the destination cartography element is that cartography element which is most probable on the basis of the order created and any assessment performed.

The measured position of the object can then be replaced by the position of the destination cartography element. The position of the destination cartography element is then the new adjusted position of the object.

Should, by way of example, the measured GPS position of a vehicle be indicated as GPS data which in reality correspond to a river, a subsequent alignment can be used to find that position for a closest road, for example, as destination cartography element. In this case, the destination cartography element is that cartography element which met the conditions of an error criterion first in a selection and has the highest probability in a second calculating algorithm step.

In line with a further exemplary embodiment of the invention, the apparatus has a first filter, said first filter being designed to ascertain a state for the object.

The first filter, which can also be called a module, gauges the system state while an object is travelling by applying a Kalman filter to the measured position of the object, for example. In the case of a vehicle, it is assumed that the object performs movements on the basis of Newton's principles. To gauge the system state completely, it is therefore necessary to assess the linearly covered distance, the speed and the acceleration.

In this case, the filter can take all the previous values in order to predict the next value. This is done recursively, however, through independent correction of an internal model which should describe reality. In this context, the filter considers a multidimensional system in which the history of a process can be described.

In line with a further exemplary embodiment of the invention, the apparatus also has a second filter, said second filter being designed to ascertain an error in the measured position.

This filter, which like the first filter may precede the selection of cartography elements in time, for example, assesses the discrepancy in the measured position using the errors committed during the map matching. In this case, this module can assess the GPS discrepancy using a Kalman filter for example. The process state of the Kalman filter then corresponds to the discrepancy in length and width. With the known equations of the Kalman filter, a new assessment of the GPS discrepancy for the width and the length is obtained for each GPS position estimate.

In line with a further exemplary embodiment of the invention, at least one of the filters has the properties of a Kalman filter.

A further exemplary embodiment of the invention specifies a system for aligning a measured position for an object with information on a digital map for a vehicle, said system having an apparatus in accordance with one of the previous exemplary embodiments and a satellite navigation receiver.

This system can be used in vehicles, for example, for more accurate and predictive position-finding or position correction determination. This can be used to considerable advantage for sending an automatic emergency call (ECall) and an automated technical service call (BCall), but also for driver assistance systems (Advanced Driver Assistance System, ADAS).

A further exemplary embodiment of the invention specifies the use of an apparatus in accordance with one of the preceding exemplary embodiments in a vehicle.

A further exemplary embodiment of the invention specifies a vehicle having an apparatus in accordance with one of the previous exemplary embodiments.

By way of example, the vehicle is a motor vehicle, such as a car, bus or heavy goods vehicle, or else a rail vehicle, a ship, an aircraft, and also a helicopter or airplane or a bicycle, for example.

In this case, this and every further exemplary embodiment of the invention applies both for an automated emergency call (ECall) and for an automated technical service call (breakdown call, BCall) or for driver assistance systems (Advanced Driver Assistance System, ADAS).

A further exemplary embodiment of the invention specifies a process for aligning a measured position for an object with information on a digital map, said process having the following steps: a computation unit is provided, a selection of cartography elements on the map is made on the basis of the measured position and on the basis of a predefined error by the computation unit, and the selected cartography elements are provided for a first and a second secondary computation unit by the computation unit.

A further exemplary embodiment of the invention specifies a program element which, when executed on a processor, instructs the processor to perform the steps indicated above.

A further exemplary embodiment of the invention specifies a medium, wherein the medium provides the program element for a download. In this case, the program element is also suitable, when executed on a processor, for instructing the processor to perform the steps indicated above.

It is likewise possible for an existing program element to be put, by means of a download, into the state in which when it is executed on a processor it instructs the processor to perform the steps indicated above.

A further exemplary embodiment of the invention specifies a computer-readable medium, wherein the computer-readable medium stores a program element which, when executed on a processor, instructs the processor to perform the steps indicated above.

A fundamental consideration of the invention can be seen in that the apparatus makes a fast preselection of cartography elements from the digital map so as subsequently to perform parallel calculation of the selected cartography elements using various methods, said methods all providing the same units of measurement. Subsequent assessment of the results then produces an optimum map matching decision, this allows substantial time and computation power to be saved.

The text below describes preferred exemplary embodiments of the invention with reference to the figures.

Figure 1:
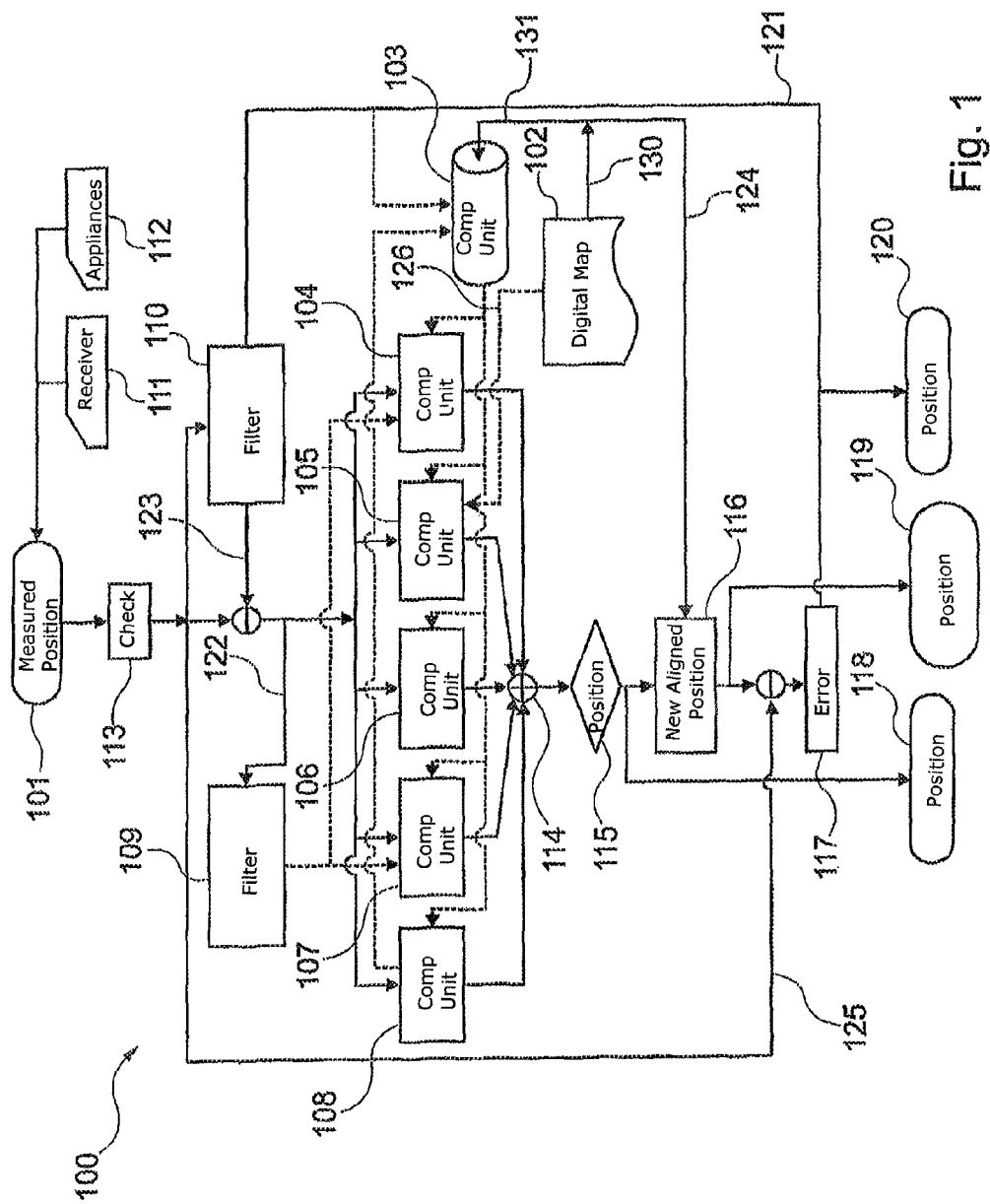
FIG. 1 shows a schematic illustration of an apparatus based on an exemplary embodiment of the invention.

The illustrations in the figures are schematic and not to scale.

DETAILED DESCRIPTION OF THE PREFERRED EMBODIMENTS

In the descriptions of the figures which follow, the same reference numerals are used for the same or similar elements.

FIG. 1 shows an apparatus 100 for aligning a measured position 101 for an object with information on a digital map 102. The information on the map may be provided by cartography elements and corresponding data, for example. In addition, a computation unit 103, which may also be in the form of a fast exclusion filter, is provided. In this case, the digital map 102 provides the information stored in it, such as the information about positions of various cartography elements, for the computation unit 103. This is illustrated by the arrows 130, 131. Similarly, this information can be passed directly to the secondary computation units 104, 105, 106, 107 and 108, which is shown by way of example by the arrow 126.

To eliminate unusable cartography elements, the computation unit 103 performs one of several possible algorithms, which selects the suitable cartography elements on the basis of the measured position 101 and on the basis of a predefined error. Following this selection, the reduced data record is made available to the secondary computation units 104, 105, 106, 107 and 108. In this case, by way of example, the first secondary computation unit 104 calculates a first value for each selected cartography element using a first method, and the second secondary computation unit 105 calculates a second value for each selected cartography element using second method.

In addition, a first filter 109 and a second filter 110 are shown. In this case, the first filter 109 is set up to ascertain the system state of the object and, in the case of a vehicle, for example, can statistically estimate the position, the speed and the acceleration of the vehicle. This filter may be in the form of a Kalman filter. To ascertain this state, the filter 109 is provided with the GPS position in a corrected version 122. Following the ascertainment of the system state by the filter 109, the result can be made available to individual or a plurality of secondary computation units. In the exemplary embodiment shown here, the secondary computation unit 107 and the secondary computation unit 104 are supplied with the information about the current system state.

The second filter 110, which may be in the form of a Kalman filter, for example, is used to iteratively eliminate or minimize errors in the GPS position as a result of an estimation process, for example. The filter 110 can therefore be supplied with the current measured position of the object 101 following a possible check by means of a checksum 113. Alternatively, the error value can be fed back to the second filter 110 by means of a feedback loop 121 after alignment has been performed.

In this case, the current measured position 110 is provided by a satellite navigation receiver 111. By way of example, NMEA files can be used in this context for the communication between navigation appliances 112.

Both filters 109 and 110 can use stochastic state estimation to determine the system state or the position error, but it is also possible for sensor data from a vehicle, for example, to be provided for the two filters or to combine the use of sensor data and the stochastic estimation. A combination of the two processes can be used in order to minimize errors which are based on erroneous sensor data.

When each of the selected cartography elements has had a respective value associated with it per secondary computation unit using the methods of the individual secondary computation units 104 to 108, these values of each cartography element are added to form a respective final value 114. These final values correspond to the probability of the object being situated at the position of the respective cartography element. It is then possible to create an order for the cartography elements on the basis of their probability in order to decide what actual position is to be used for the alignment. This corresponds to the destination cartography element with its geographical position 115.

In this context, the apparatus 100 in FIG. 1 is set up to output the destination cartography element, the new aligned position and the error in the new aligned position in comparison with the originally measured position 118, 119 and 120. In a further step, the new aligned position 116 and the provision of the measured position 125 are used to calculate an error value 117. This error can furthermore be made available by means of feedback to the offset eliminating filter 110 in a feedback loop 121 in order to iteratively calculate as accurately an aligned position as possible for the object using fresh steps.

In this case, it is of particular significance that the various methods of the secondary computation units or modules use and deal with different physical parameters and hence different physical units of measurement and therefore cannot be compared with one another directly. The inventive conversion of the various values into the same unit of measurement allows direct comparison of the probabilities of the potential positions of the vehicle or positions of the relevant cartography elements.

In this case, the first secondary computation unit 104 can perform the method of the road distance module, for example. The second secondary computation unit 105 can calculate values for the cartography elements using the method of a memory module, for example. The third secondary computation unit 106 can appraise the probability for the relevant cartography elements using the method of path probability or using a size module. The fourth secondary computation unit 107 can perform the method of an angle module, for example. By contrast, the fifth subunit 108 can perform the method of a distance module, for example.

The text below will present individual methods which can be used in the secondary computation units by way of example.

The distance module calculates a point number for each cartography element. The equivalent point number Pdistance for a prescribed distance Dcs is standard (ratio one to one) since the result of this module is already expressed in meters, and in this case meters is the standard unit of measurement as an example.

$$Pdistance=Dcs$$

In the case of what is known as the angle module, it is necessary to analyze why a large angle between the actual route and the individual segments of the map makes the segment less probable. The speed is the key factor. The faster the receiver or the object is moving, the greater influence an incorrect angle has. The extreme case occurs when the speed is equal to zero or very low. In that case, the error angle should have no influence at all for the following two reasons:

Firstly, the route vector which is required in order to calculate the angle with respect to the segment vector is not very stable because its starting and end points are very close together. Secondly, the distance error is very small in the next example.

The ratio for the evaluation Pangle, which is expressed by an angle, is then proportional to the amount of error caused by the angle on average during the next time interval at the actual speed:

$$Pangle = \frac{1}{2} \cdot \sin(\alpha_{cs}) \cdot v \cdot \Delta t$$

Here, $\alpha_{cs}$ corresponds to the angle between the root vector and the individual segment vectors, v corresponds to the estimated actual speed and $\Delta t$ corresponds to the estimated time increment between the last random sample and the next. To use this, it is necessary to estimate speed v and time increment $\Delta t$. This can be done using a Kalman filter, for example. These errors induced on average are shown graphically in FIG. 3. The average of a linear sequence which starts at zero corresponds to half the maximum value. The maximum error corresponds to sin $\alpha_{cs}$·Base and Base is equal to v·$\Delta t$.

To apply the map matching to motor vehicles, it may be more efficient to read off the values from the vehicle sensors, such as in the ABS system, which could improve the accuracy of the values of distances and speeds within a short period in comparison with those which are received by means of a GPS receiver.

The memory module takes account of the fact that logically the last known road or at least a road connected thereto has a relatively high probability of actually being the current road. The memory module can be adapted to suit its own needs to a very high degree, and it is possible to change the memory effect of this module by setting parameters as appropriate.

A relatively high point number in a segment corresponds to a relatively high probability of this segment being the correct one. In this case, the points system is inverse in comparison with the points system of the other modules, because it can be adapted by the user and in this way corresponds to the description of the probability distribution function. For this reason, the result (the point number) from this module corresponds to this—inverse—function.

By modifying these parameters, it is possible to change the form of the functions which transform the memory into a point number. The memory states that a segment has previously been selected or that it was connected directly to a segment.

The path probability/size module ensures that a relatively major road is assessed with a higher level of probability because firstly more vehicles use it and secondly it has a larger surface. As far as the first point is concerned, the amount of vehicles on a road and therefore the corresponding segments are dependent on a series of factors which are difficult to define. It is assumed that this amount of vehicles is proportional to the size of the road. In this way, it is assumed that the vehicles are evenly distributed over the road. In respect of the size of the road, the evaluation $P_{size}$ a segment with the width $W_s$ of corresponds to the maximum possible error or the maximum possible variable, i.e.

$$Psize=\tfrac{1}{2}Ws$$

This point number is converted together with the point number from the memory module before it is compared with the other point numbers, because the other point numbers are low if they represent probable segments and high if they represent improbable segments.

This has the following significance: the wider the road, the more probable it is. This can be represented graphically by virtue of the GPS positions having a tolerated error which corresponds to half the road width. This is feedback of the secondary computation units to the second filter 110.

The road distance module provides a result $S_d$ which is already expressed in meters. For this reason, the conversion to an evaluation Pstreet is simple:

$$Pstreet=|\tilde{S}_d-S_d|$$

Here, $\tilde{S}_d$ corresponds to the estimate of the distance covered on a road, for example calculated using the state of a Kalman filter.

If the map matching is to be applied to motor vehicles, there is again an improvement in the accuracy in this case too by virtue of the covered distance which has been calculated by a vehicle sensor being used instead of the estimate $\tilde{S}_d$. This is not a derived value, and the accuracy is much higher with the small distances than the estimated value of the GPS data.

The road distance module is a completely new method of map matching. A Kalman filter is used to appraise the current motion state and the distance covered on the road. This module is based on totally independent map matching which does not require the further secondary computation units and methods. This task merely requires a starting point and a special decision module for cases of doubt. If this module is combined with other modules, this requirement is already covered by all the other modules.

All the other modules attempt to correct the position transversely with respect to the road direction. This module performs an estimate in the longitudinal direction and ascertains the position by means of longitudinal projection of the distance covered on the current road. This means that the distance covered is ascertained and all the possible positions on a road which correspond to this distance are sought. Starting from these positions, it follows all the possible road directions and indicates the distance in this regard.

It is thus possible to use the apparatus and align data even when operation of the GPS receiver is interrupted, for example because the signal has broken off in a tunnel or under a bridge. This module can also make a decision without GPS information if, during this time without a connection, no other roads cross, which is normally the case in tunnels. This module therefore provides the system with the option of "compound navigation" (also called Dead Reckoning). This is a further significant advantage of the invention.

Figure 6:
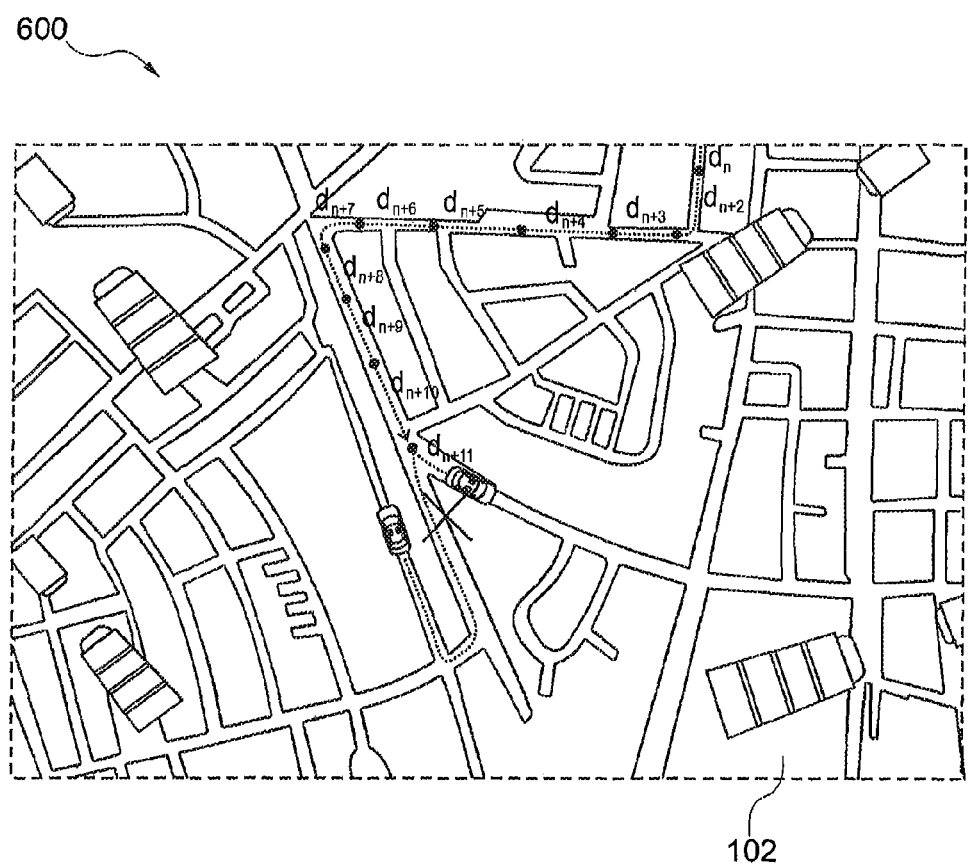
FIG. 6 shows a schematic illustration of a calculation by a road distance module based on an exemplary embodiment of the invention.

An example of how this module weighs up two possible positions is shown in FIG. 6. Here, the two vehicles shown represent the two possible positions, and $\overline{d}_{n+11}$ corresponds to the estimate of the next distance covered. This module is complex in terms of computation, because the minimum distance to each possible road point needs to be calculated backwards, since there may be different paths from a point A to another point B and all of them need to be analyzed. The estimated covered distance is now calculated using a Kalman filter, for example. If the map matching is used in motor vehicles, however, the accuracy can be significantly increased by this module, because the vehicle sensors can be used to estimate this covered distance and not the derived information from the GPS, as in the case of the Kalman filter. A further Kalman filter which uses vehicle sensors should then be implemented in order to calculate these covered distances.

Figure 2:
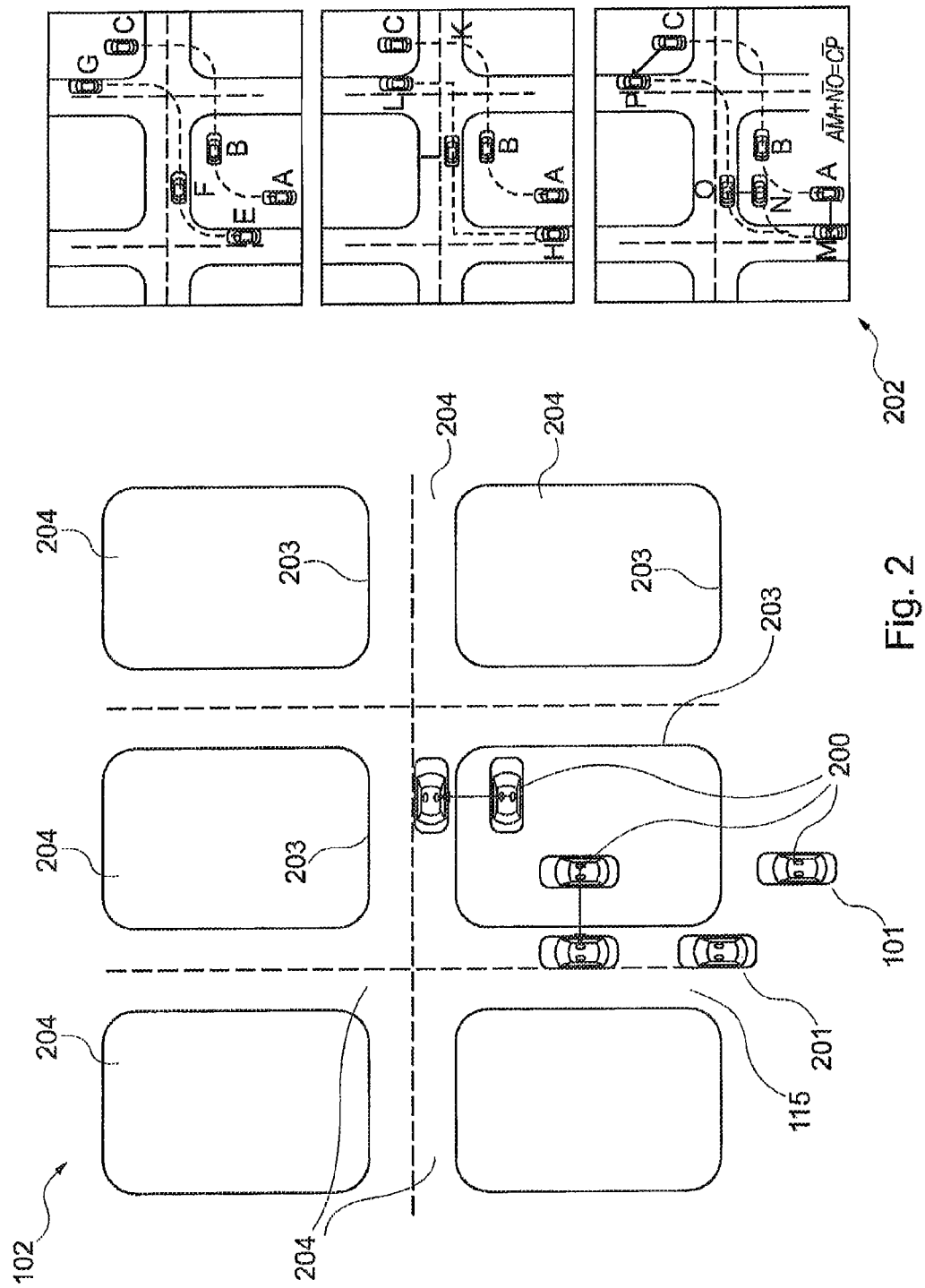
FIG. 2 shows a schematic illustration of a digital map for an apparatus based on an exemplary embodiment of the invention.

FIG. 2 shows a digital map 102 which shows a measured position for a vehicle 101 which cannot match with the infrastructure of the map shown. According to the measured positions, the vehicle 200 is situated within a building 203. In this situation, the inventive apparatus and the inventive process can use the fast exclusion filter function and can use the combination of various methods for calculating and assessing the various cartography elements in order to determine the actual position of the vehicle. In this context, the precise determination can also be effected iteratively and with a control loop. In addition, exemplary cartography elements 204, roads and buildings are shown.

FIG. 2 also shows the new aligned position 201 after the destination cartography element 115 has been selected. This corresponds to the new aligned position of the vehicle 201. In addition, FIG. 2 shows possible calculation of the new aligned position 202 by means of vectorial representation of segments and routes covered by the vehicle.

Figure 3:
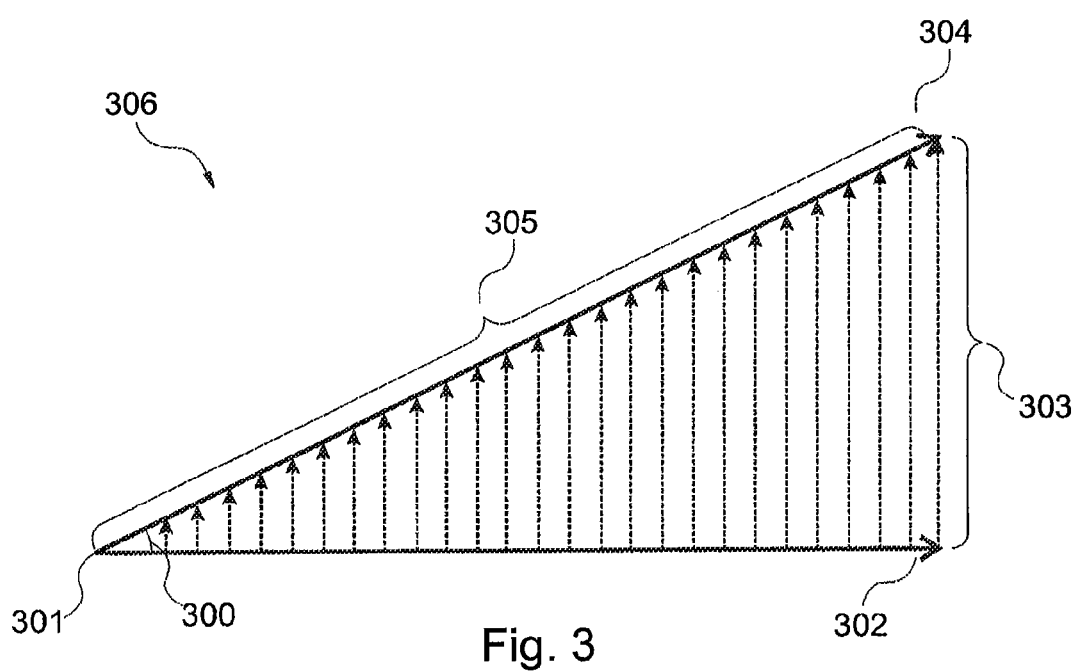
FIG. 3 shows an induced error during a calculation in a computation unit based on an exemplary embodiment of the invention.

FIG. 3 shows the induced error in the case in which the secondary computation unit performs the method of an angle module. On the basis of a current position 301 for a segment direction or road direction 302 and the current route of the vehicle 304, it is possible to represent the value v ΔT 305 as shown. In this case, an angle between the road vector and the segment vector 300 is indicated. The induced error 303 during the next time interval is shown at the right-hand border of the figure as a height of the triangle.

Figure 4:
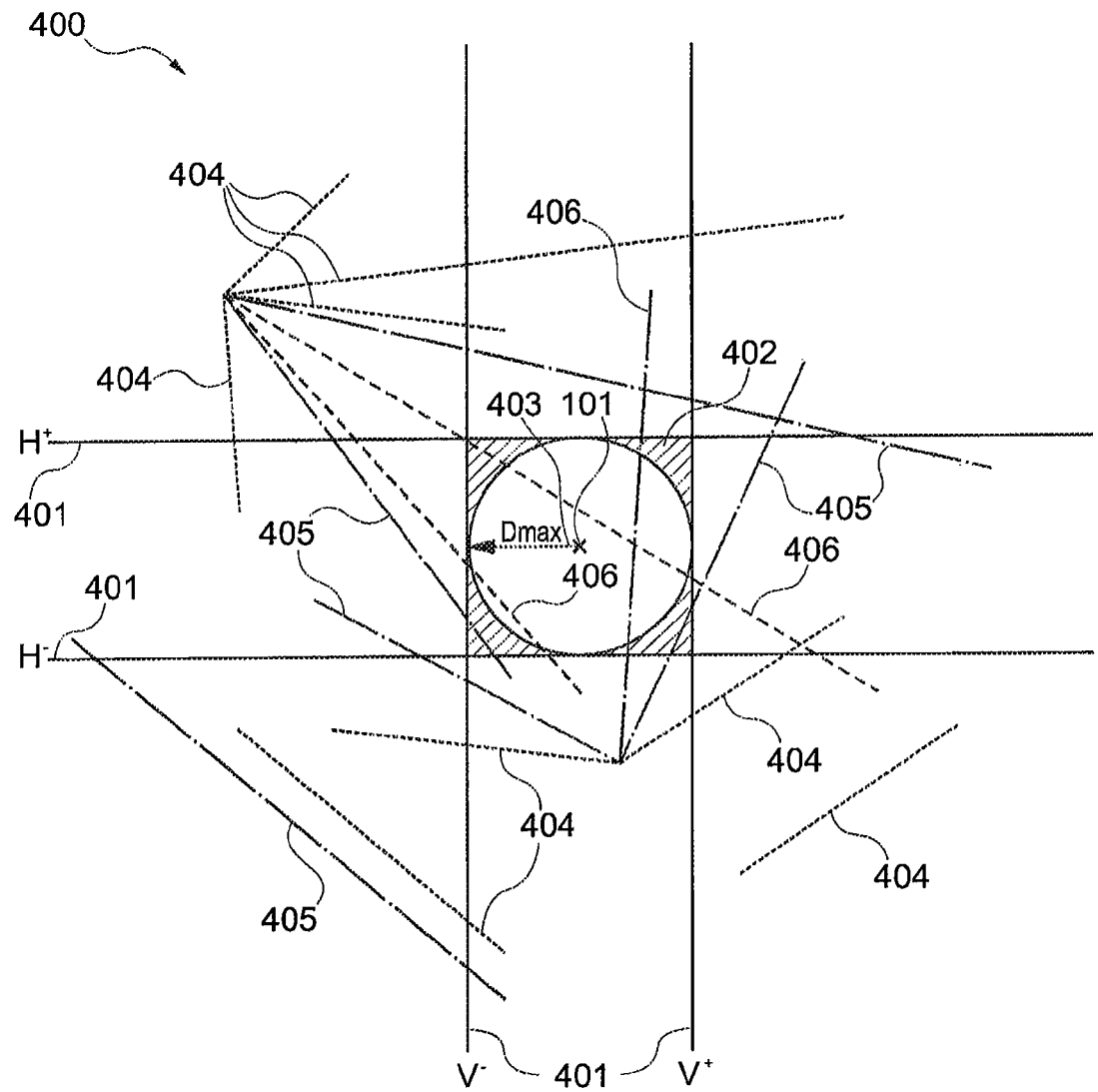
FIG. 4 shows a schematic illustration of the selection of cartography elements based on an exemplary embodiment of the present invention.

FIG. 4 shows a graphical representation of the function of the fast exclusion filter or the computation unit. In this case, the computation unit is designed to make a first selection of cartography elements on the map on the basis of the measured position and on the basis of a predefined error. In other words, the algorithm 400 for the fast exclusion of segments or elements of a map is shown. In this case, a square area 402 with the boundaries 401 is shown. The maximum error Dmax 403, which is shown as the radius of a circle, describes the area around the measured position 101 which must contain the admissible segments. In this case, segments which have been picked out correctly 404 and segments which have not been picked out even though they do not meet the ideal filter condition of the maximum distance Dmax 405 are shown. Segments 406 which have correctly not been sorted out are likewise shown. In this context, it should again be pointed out that the term cartography element means nodes, segments, paths and loops.

FIG. 4 therefore shows a graphical representation of the manner of operation of an exemplary embodiment of the computation unit or the fast exclusion filter for the first selection. This involves an exemplary algorithm in the computation unit. This fast exclusion filter is required in order to be able to weigh up all the modules or secondary computation units simultaneously. It is a relatively complex procedure to select the segments within a maximum radius. The admissible area of this selection is ideally a circle. In this case, however, it is necessary to calculate whether the segments are within the maximum error on the basis of the following complex formulae, for example:

$$D_{max} \geq \sqrt{d_x^2 + d_y^2} = \sqrt{(p_x - c_x)^2 + (p_y - c_y)^2}$$

(it should be noted that the root function in the above formula relates to the entire expression in each case), where Dmax corresponds to the maximum radius[11], $\vec{C} = (c_x, c_y)$ corresponds to the coordinates of the center of the circle and in this case to the coordinates of the received GPS position, $\vec{P} = (p_x, p_y)$ corresponds to the coordinates of the cartography elements and $CP = (d_x, d_y)$ corresponds to the coordinate differences between these the last elements mentioned.

The computational complexity is even higher if the cartography elements are segments, because it is necessary to calculate the shortest distance from the line which is formed by the two ends of the segment by projecting the center onto this line and then assessing whether this projection is within the segment. If this is not the case, the minimum distance corresponds to the distance from the closest segment end.

The calculation of the segments within a maximum distance is complicated, but this module performs exactly the opposite of this. It does not look for valid segments, because this would require an exhaustive search, but rather looks for all invalid segments which can be picked out easily. In other words: it is difficult to calculate the segments within a maximum distance without picking out some segments which go beyond this distance. This means that the search does not need to be exhaustive, because the only difficulty is that a segment far away would not be picked out. This new idea achieves the best possible filtering without making the calculations even more complex. This means that additional elements are available which could have been picked out and which correspond to the following formula:

$$\Delta \epsilon_1 = \sim 2\%$$

A further admissible approximation is to transform the shape of the maximum distance, which is ideally a circle, into a square. This makes linear comparison of the distances possible.

This means that the following set of elements is not filtered, which could have been picked out if an ideal circular shape had been used:

$$\Delta\epsilon_2 = \frac{UsedSurface - IdealSurface}{UsedSurfac} =$$

$$\frac{(2 \cdot d)^2 - \pi \cdot d^2}{(2 \cdot d)^2} = \frac{(4-\pi) \cdot d^2}{4 \cdot d^2} = \frac{4-\pi}{4} = 21.46\%$$

In this way, 21.46% of the admissible segments would have been able to have been picked out by using a filter if the filter is able to select the elements within a circle. However, this would have been an integrated filter with a very much more complex computation method.

Finally, the total amount of segments for which this filter allows fast exclusion of elements and which could have been eliminated using a more complex and integrated filter corresponds to:

$$\Delta\epsilon_{total} = \Delta\epsilon_1 = \Delta\epsilon_2 = \sim 23.46\%$$

To reduce this amount of incorrectly admissible segments and to allow the modules to assess only the segments in the circle, a second filter can be used for the filtered elements. This means that only the filtered elements (elements within the square) are filtered again with an integrated filter (in which case only the elements in a circle are selected). In the case of a square area, it is possible to set four different boundaries: $H^+$, $H^-$, $V^+$ and $V^-$.

It is then possible to pick out a generic segment $S_{ab}$ which goes from the Nodes $\vec{a}=(a_x,a_y)$ to $\vec{b}=(b_x,b_y)$ if one of the following conditions applies:

$a_x > V^+$ and $b_x > V^+$ $a_x < V^-$ and $b_x < V^-$ $a_y > H^+$ and $b_y > H^+$ $a_y < H^-$ and $b_y < H^-$ This exemplary filter method for the fast exclusion of cartography elements is illustrated graphically in FIG. 4.

Figure 5:
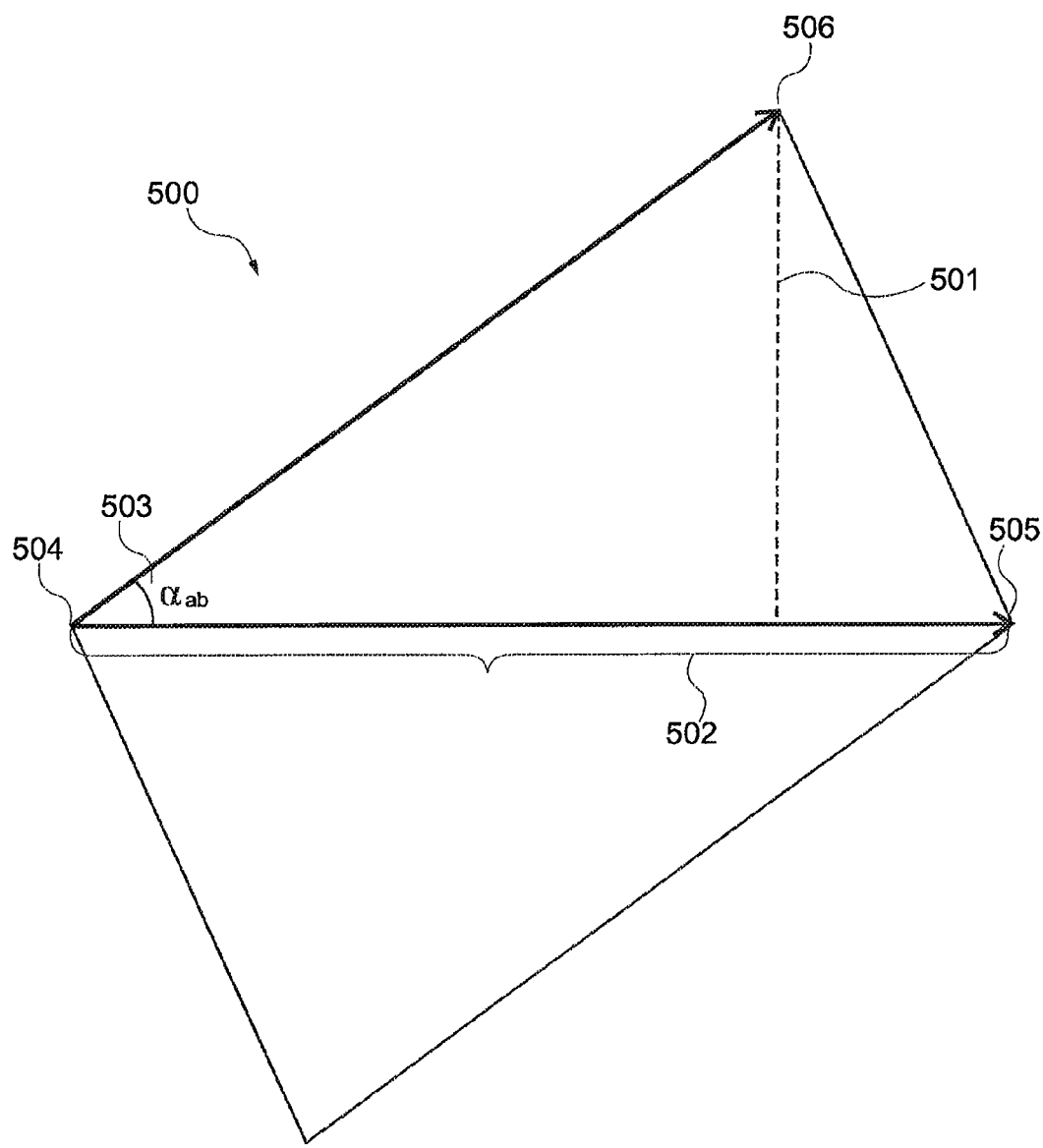
FIG. 5 shows a schematic illustration of a calculation by a secondary computation unit based on an exemplary embodiment of the invention.

FIG. 5 shows an equivalent parallelogram 500 for calculation by the distance module. This calculation is performed in the secondary computation units 104 to 108 in FIG. 1, for example. In this case, the height is denoted by 501, the base is denoted by 502, the angle is denoted by 503, P1 is denoted by 504, P2 is denoted by 505 and C is denoted by 506.

FIG. 6 shows a schematic illustration of a digital map 102 which shows the calculation by a road distance module 600.

Figure 7:
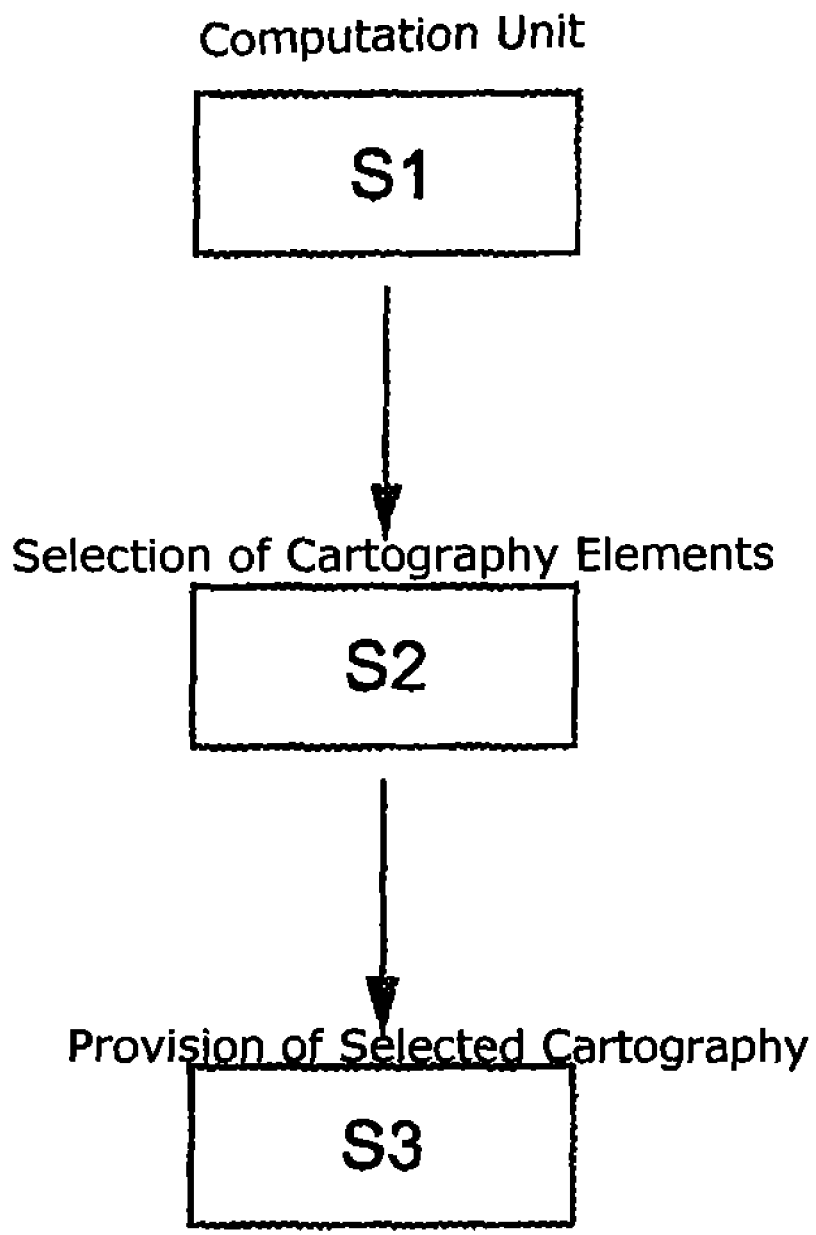
FIG. 7 shows a schematic illustration of a flowchart for a process based on a further exemplary embodiment of the invention.

FIG. 7 shows a schematic illustration of a flowchart which depicts a process based on an exemplary embodiment of the invention.

In step S1, a computation unit is provided. In step S2, a selection of cartography elements on the map is made on the basis of the measured position and on the basis of a predefined error by the computation unit. Step S3 is provision of the selected cartography elements for a first and a second secondary computation unit by the computation unit.

It should additionally be pointed out that "comprising" and "having" do not exclude other elements or steps and "a" or "an" does not exclude a multiplicity. Furthermore, it should be pointed out that features or steps which have been described with reference to one of the above exemplary embodiments can also be used in combination with other features or steps from other exemplary embodiments described above. Reference symbols in the claims should not be regarded as restrictive.

What is claimed:

1. An apparatus for aligning a measured position for an object with information on a digital map, said apparatus comprising:
a computation unit that is configured to make a first selection of a plurality of cartography elements which are potential alignment positions for the object, the cartography elements being selected from the map on a basis of the measured position and on a position of a predefined error;
wherein the computation unit is further configured to provide the selected cartography elements for a first and a second secondary computation unit,
wherein the first secondary computation unit is configured to calculate a first value based on a first physical parameter between the measured position and each selected cartography element using a first method, and the second secondary computation unit is configured to calculate a second value based on a second physical parameter between the measured position and each selected cartography element using a second method, the first physical parameter and first method being different than the second physical parameter and second method respectively, and
wherein the apparatus generates a final probabilistic value for each selected cartography element based on the respective first value and the respective second value of each selected cartography element, and aligns the object with one of the selected cartography elements chosen based on the final probabilistic value.

2. The apparatus as claimed in claim 1,
wherein the first and second values are calculated in the same unit of measurement.

3. The apparatus as claimed in claim 2,
wherein the apparatus is configured to add the first and the second value of each selected cartography element to form the respective final value.

4. The apparatus as claimed in claim 2,
wherein the apparatus is configured to assess the first secondary computation unit and to assess the second secondary computation unit, which results in a corresponding weighting for the two values of each selected cartography element.

5. The apparatus as claimed in claim 3,
wherein the apparatus is configured to make a second selection of a destination cartography element from the selected cartography elements on the basis of the final values; and
wherein the apparatus is configured such that an alignment is performed on the basis of the destination cartography element.

6. The apparatus as claimed in claim 1, said apparatus further comprising a first filter, wherein the first filter is configured to ascertain a state for the object.

7. The apparatus as claimed in claim 6, said apparatus further comprising a second filter, wherein the second filter is configured to ascertain an error in the measured position of the object.

8. The apparatus as claimed in claim 7, wherein at least one of the filters is a Kalman filter.

9. A system for aligning a measured position for an object with information on a digital map for a vehicle, said system having:
an apparatus as claimed in claim 1; and
a satellite navigation receiver.

10. A vehicle having an apparatus as claimed in claim 1.

11. A process for aligning a measured position for an object with information on a digital map, said process comprising the steps of:

providing a computation unit (S1);

selecting a plurality of cartography elements which are potential alignment positions for the object, the cartography elements being selected from the map on a basis of the measured position and on a basis of a predefined error by the computation unit (S2);

providing the selected cartography elements for a first and a second secondary computation unit by the computation unit (S3);

calculating, by the first secondary computation unit, a first value based on a first physical parameter between the measured position and each selected cartography element using a first method;

calculating, by the second secondary computation unit, a second value based on a second physical parameter between the measured position and each selected cartography element using a second method, the first physical parameter and the first method being different than the second physical parameter and the second method respectively;

generating a final probabilistic value for each selected cartography element based on the respective first value and the respective second value of each selected cartography element; and aligning the object with one of the selected cartography elements chosen based on the final probabilistic value.

12. A non-transitory computer-readable medium which stores a program element which, when executed on a processor, instructs the processor to align a measured position for an object with information on a digital map by performing the following steps:

providing a computation unit;

selecting cartography elements which are potential alignment positions for the object, the cartography elements being selected from a map on a basis of a measured position and on a basis of a predefined error by the computation unit;

wherein the selected cartography elements are provided for a first and a second secondary computation unit by the computation unit;

calculating, by the first secondary computation unit, a first value based on a first physical parameter between the measured position and each selected cartography element using a first method;

calculating, by the second secondary computation unit, a second value based on a second physical parameter between the measured position each selected cartography element using a second method, the first physical parameter and the first method being different than the second physical parameter and the second method respectively;

generating a final probabilistic value for each selected cartography element based on the respective first value and the respective second value of each selected cartography element; and aligning the object with one of the selected cartography elements chosen based on the final probabilistic value.

13. An apparatus for aligning a measured position for an object with information on a digital map, said apparatus comprising:

a computation unit that is configured to make a first selection of cartography elements from the map on a basis of the measured position and on a position of a predefined error, wherein the computation unit is further configured to provide the selected cartography elements for a first and a second secondary computation unit, wherein the first secondary computation unit is configured to calculate a first value for each selected cartography element using a first method, wherein the second secondary computation unit is configured to calculate a second value for each selected cartography element using a second method, wherein the first and second values are calculated in the same unit of measurement, and wherein the apparatus is configured to add the first and the second value of each selected cartography element to form a respective final value.

14. An apparatus for aligning a measured position for an object with information on a digital map, said apparatus comprising:

a computation unit that is configured to make a first selection of cartography elements from the map on a basis of the measured position and on a position of a predefined error, wherein the computation unit is further configured to provide the selected cartography elements for a first and a second secondary computation unit, wherein the first secondary computation unit is configured to calculate a first value for each selected cartography element using a first method, wherein the second secondary computation unit is configured to calculate a second value for each selected cartography element using a second method, wherein the first and second values are calculated in the same unit of measurement, and wherein the apparatus is configured to assess the first secondary computation unit and to assess the second secondary computation unit, which results in a corresponding weighting for the two values of each selected cartography element.

* * * * *